UNITED STATES PATENT OFFICE.

PAUL FLEMMING, OF HAMBURG, GERMANY.

DISINFECTANT.

1,162,152.   Specification of Letters Patent.   Patented Nov. 30, 1915.

No Drawing.   Application filed January 26, 1914.   Serial No. 814,539.

*To all whom it may concern:*

Be it known that I, Dr. PAUL FLEMMING, chemist, citizen of Germany, subject of the German Emperor, residing at Moorfurtweg 13-15, in the free town of Hamburg, in the State of Hamburg and Empire of Germany, have invented new and useful Improvements in Disinfectants, of which the following is a specification.

The chlorinated cresols are known as having an extraordinarily strong disinfectant effect. Also chlorinated xylenols display an enormously strong bactericidal effect and this exceeds, as has been established, even that of p-chloro-m-cresol which is especially well known as a disinfectant. The surprising discovery has now been made that by mixing together the two kinds of disinfectant substances, viz, clorinated cresol with chlorinated xylenol the disinfectant effect is immensely increased. A succession of bacteriological experiments has correspondingly demonstrated that mixtures of chloro-xylenol with chloro-cresol are bacteriologically approximately double as effective as the same quantities of the same chloro-xylenol or chloro-cresol by themselves. This is clearly shown from the following table which sets forth the results of exact bacteriological examinations of different chlorinated xylenols and cresols referred to pure carbolic acid and in which a + sign in the usual way signifies that the reaction has resulted positively *i. e.* that living bacteria still survive, while a − sign shows the negative result of the reaction— the killing of all bacteria. The substances in question were made soluble in water by treatment with alkali and glycerids in the known manner.

Table.

Determination of the disinfectant value with *Bacillus typhosus* compared with phenol as unit. Execution, 6 drops of 24 hour bouillon culture to 10 ccm. disinfectant solution. Subcultures 10 ccm. nutrient bouillon, carrying over with 3 mm. diameter loop. Results registered after 48 hours.

| | | Duration of influence in minutes. | | | | | Carbolic acid coefficients. |
|---|---|---|---|---|---|---|---|
| | | 6 | 12 | 18 | 24 | 30 | |
| Phenol | 1:125 | + | + | − | − | − | |
| Phenol | 1:110 | + | − | − | − | − | |
| Chloro-o-cresol, M.P. 48–49°, 12% | 1:200 | + | − | − | − | − | $\frac{200}{110}=1.8$ |
| | 1:400 | + | + | + | + | + | |
| | 1:600 | + | + | + | + | + | |
| | 1:800 | + | + | + | + | + | |
| Phenol | 1:125 | + | + | − | − | − | |
| Phenol | 1:110 | + | − | − | − | − | |
| Chloro-xylenol, M.P. 117°, 12% | 1:200 | − | − | − | − | − | $\frac{800}{125}=6.4$ |
| | 1:400 | − | − | − | − | − | |
| | 1:600 | − | − | − | − | − | |
| | 1:800 | + | + | − | − | − | |
| Chloro-o-cresol, M.P. 48–49°, chloro-xylenol, M.P.117°, together 12% | 1:200 | − | − | − | − | − | $\frac{600}{110}=5.5$ |
| | 1:400 | − | − | − | − | − | |
| | 1:600 | + | − | − | − | − | |
| | 1:800 | + | + | + | + | + | |
| Chloro-xylenol, M.P. 73°, p-chloro-m-cresol, M.P.66°, together 12% | 1:200 | − | − | − | − | − | $\frac{800}{125}=6.4$ |
| | 1:400 | − | − | − | − | − | |
| | 1:600 | − | − | − | − | − | |
| | 1:800 | + | + | − | − | − | |
| Chloro-xylenol, M.P. 73°, 12% | 1:200 | − | − | − | − | − | Effect changeable on account of separations. Approximately 4. |
| | 1:400 | − | − | + | − | + | |
| | 1:600 | + | + | + | + | + | |
| | 1:800 | + | − | + | + | + | |
| p-Chloro-m-cresol, M.P. 66°, 12% | 1:200 | − | − | − | − | − | Approximately 3. |
| | 1:400 | + | + | + | + | + | |
| | 1:600 | + | + | + | + | + | |
| | 1:800 | + | + | + | + | + | |
| Chloro-o-cresol, M.P. 48–49°, chloro-xylenol, M. P. 73°, together 12% | 1:200 | − | − | − | − | − | $\frac{600}{110}=5.5$ |
| | 1:400 | − | − | − | − | − | |
| | 1:600 | + | − | − | − | − | |
| | 1:800 | + | + | + | + | + | |

It has been found that in all cases the disinfectant effect of a mixture of chlorinated-xylenol and chlorinated cresol is by far higher than the effect of one of the components of the mixture even if added to that of the other component. Similar results are also obtained from examination of different preparations of such a mixture *e. g.* if instead of the soap solutions alcoholic solutions or solutions of the corresponding alkali salts are employed, the mixture always shows itself to be of stronger effect than could have been foreseen from the effect of the components employed.

An observation deserving especial notice is that for the manufacture of such disinfectants instead of chlorinated cresols their complex alkali salts according to U. S. Patent No. 1,036,087 may with advantage be employed and it has been found that thereby no increase of corrosive effect or prejudice to bactericidal strength arises. This was by no means to be anticipated because it was understood hitherto that free phenols developed a less considerable corrosive action with higher bactericidal strength than their alkali salts (compare Schneider: *Zeitschrift für Hygiene und Infektionskrankheiten* 1906 vol. 53 page 116).

A disinfectant prepared in the way mentioned with complex alkali salts possesses the advantage of its solutions in tap water being essentially more transparent. Further, by employing complex chloro-cresol alkali salts soluble in water in those cases where the chloro-xylenol is made soluble in water by means of soap the possibility is attained of using essentially less soap than when the corresponding free chloro-cresols are employed. As the chlorinated xylenols need proportionately much soap in order, even in the case of large dilution, to be kept permanently in solution so there is in the joint employment of the complex alkali salts of the chloro-cresols not only a saving but also in addition an advantage with reference to the physical quality of the new disinfectant. The mixture of chloro-cresol and chloro-xylenol provides a disinfectant of strong effect in small quantity.

As shown in the table given preparations which for example only contain 12% of a molecular mixture of symmetrical chloro-xylenol and p-chloro-m-cresol have already an effect approximately six times as strong as 100% pure carbolic acid. The latter is, however as is well known, in dilutions capable of being used as disinfectants strongly corrosive and poisonous whereas the aforesaid mixtures in consequence of their small content of active substance are absolutely free from risk or harm to the user. Moreover both symmetrical chloro-xylenol and also p-chloro-m-cresol are considerably less poisonous than carbolic acid and the corrosive effect is less. The proportion of each of the two components of the disinfecting compound may be from 1 to 50%.

Having now described my invention what I claim and desire to secure by Letters Patent of the United States is:

1. A disinfectant compound comprising chlorinated xylenol and chlorinated cresol.

2. A disinfectant compound comprising chlorinated xylenol and chlorinated cresol, the chlorinated cresol being employed in the form of a double compound of a chloro-cresol alkali salt with free chloro-cresol.

In testimony whereof I have hereunto set my hand in presence of two subscribing witnesses.

DR. PAUL FLEMMING.

Witnesses:
E. H. L. MUMMENHOFF,
EDUARD HOPF.